(12) United States Patent
Masui et al.

(10) Patent No.: US 12,007,235 B2
(45) Date of Patent: Jun. 11, 2024

(54) MAGNETIC ENCODER

(71) Applicant: SMC CORPORATION, Chiyoda-ku (JP)

(72) Inventors: Ryuichi Masui, Bando (JP); Naohiro Ishizawa, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 207 days.

(21) Appl. No.: 17/633,822

(22) PCT Filed: Aug. 5, 2020

(86) PCT No.: PCT/JP2020/030068
§ 371 (c)(1),
(2) Date: Feb. 8, 2022

(87) PCT Pub. No.: WO2021/029305
PCT Pub. Date: Feb. 18, 2021

(65) Prior Publication Data
US 2022/0299306 A1    Sep. 22, 2022

(30) Foreign Application Priority Data
Aug. 9, 2019 (JP) .................. 2019-148028

(51) Int. Cl.
*G01B 7/30* (2006.01)
*G01D 5/20* (2006.01)
(Continued)

(52) U.S. Cl.
CPC .................. *G01B 7/30* (2013.01); *G01D 5/20* (2013.01); *G01P 1/026* (2013.01); *G01P 3/487* (2013.01);
(Continued)

(58) Field of Classification Search
CPC .......... G01B 7/30; G01D 5/20; G01D 11/245; G01D 5/145; G01D 2205/50; G01D 5/12;
(Continued)

(56) References Cited

U.S. PATENT DOCUMENTS

| 9,127,718 B2 * | 9/2015 | Barcat .................. G01D 11/245 |
| 2009/0289623 A1 * | 11/2009 | Sano .................... G01D 11/245 |
| | | 324/207.25 |

(Continued)

FOREIGN PATENT DOCUMENTS

| JP | 5-55020 U | 7/1993 |
| JP | 2004-184319 A | 7/2004 |

(Continued)

OTHER PUBLICATIONS

International Search Report dated Sep. 24, 2020 in PCT/JP2020/030068 filed on Aug. 5, 2020, (3 pages).

(Continued)

*Primary Examiner* — Raul J Rios Russo
(74) *Attorney, Agent, or Firm* — Oblon, McClelland, Maier & Neustadt, L.L.P.

(57) ABSTRACT

A magnetic encoder is provided with a first member including a first wall part that has formed therein an insertion through-hole through which a rotary body is passed, and a second member including a second wall part. A permanent magnet and a magnetic sensor for detecting a change in the magnetic field formed by the permanent magnet are disposed between the first wall part and the second wall part. In this configuration, the first member and the second member are composed of a soft steel that contains at most 3.0 wt % of carbon.

6 Claims, 6 Drawing Sheets

(51) Int. Cl.
*G01P 1/02* (2006.01)
*G01P 3/487* (2006.01)
*G01P 3/488* (2006.01)
*G01D 5/14* (2006.01)

(52) U.S. Cl.
CPC .............. *G01P 3/488* (2013.01); *G01D 5/145* (2013.01); *G01D 5/2013* (2013.01)

(58) Field of Classification Search
CPC ...... G01D 5/245; G01D 5/2013; G01P 3/488; G01P 1/026; G01P 3/487
USPC ...................................... 324/207.15
See application file for complete search history.

(56) References Cited

U.S. PATENT DOCUMENTS

| | | | |
|---|---|---|---|
| 2010/0176801 A1* | 7/2010 | Aruga | G01D 5/2451 324/207.22 |
| 2012/0105055 A1 | 5/2012 | Takahashi et al. | |
| 2013/0221956 A1* | 8/2013 | Kotani | G01D 5/145 324/207.25 |
| 2014/0368192 A1* | 12/2014 | Kaneko | G01D 5/145 324/207.25 |
| 2020/0132507 A1 | 4/2020 | Osada | |
| 2021/0231462 A1 | 7/2021 | Torii et al. | |

FOREIGN PATENT DOCUMENTS

| | | |
|---|---|---|
| JP | 2011-27719 A | 2/2011 |
| JP | 2015-1511 A | 1/2015 |
| JP | 2019-15536 A | 1/2019 |
| JP | 6529692 B1 | 6/2019 |
| RU | 2 511 000 C2 | 4/2014 |
| RU | 2 637 231 C1 | 12/2017 |

OTHER PUBLICATIONS

Russian Office Action dated Oct. 10, 2022 in Russian Patent Application No. 2022106064 (with unedited computer generated English translation), 12 pages.

Russian Office Action dated Oct. 10, 2022 in Russian Patent Application No. 2022106064 (with unedited computer generated English translation), 4 pages.

* cited by examiner

MAGNETIC ENCODER

TECHNICAL FIELD

The present invention relates to a magnetic encoder for detecting an angle of rotation of a rotating body.

BACKGROUND ART

As is well known, a magnetic encoder includes a permanent magnet and a magnetic sensor, and is widely used as a device for detecting the position and the angle of rotation of a rotating body. As disclosed in JP 2019-015536 A, the permanent magnet rotates accompanying the rotation of a rotating body that is fixed to a rotating shaft of a motor. Due to such rotation, a magnetic field generated by the permanent magnet changes. The magnetic sensor detects the change in the magnetic field. As a result, the angle of rotation (or the amount of rotation) of the rotating shaft is obtained.

In such a configuration, when the permanent magnet or the magnetic sensor is influenced by an external magnetic field, the detected value becomes a value that differs from the actual angle of rotation. Specifically, the accuracy of the detection result of the angle of rotation is reduced. In order to avoid such an occurrence, in JP 2015-001511 A, it is proposed to provide a magnetic shield member in the interior of an encoder cover that covers the magnetic encoder, and to block the external magnetic field by the magnetic shield member. Moreover, in JP 2015-001511 A, cold-rolled steel sheets and permalloys are exemplified as materials for the magnetic shield member.

SUMMARY OF INVENTION

Recently, it has been required to further improve the accuracy in detecting the angle of rotation of a rotating body by a magnetic encoder, in an environment that is influenced by an external magnetic field.

A principal object of the present invention is to provide a magnetic encoder that is capable of reducing the influence of an external magnetic field.

Another object of the present invention is to provide a magnetic encoder in which the detection accuracy thereof is further improved.

According to an embodiment of the present invention, a magnetic encoder is provided having a permanent magnet configured to rotate accompanying rotation of a rotating body constituting a rotational drive unit, and a magnetic sensor configured to detect a change in a magnetic field of the permanent magnet, the magnetic encoder comprising: a first member including a first wall portion in which an insertion hole is formed through which the rotating body is passed; a second member including a second wall portion sandwiching the permanent magnet and the magnetic sensor between the second wall portion and the first wall portion; wherein the first member and the second member are made of a mild steel containing up to 3.0% by weight of carbon.

According to the present invention, the first member and the second member, which respectively include the first wall portion and the second wall portion sandwiching the permanent magnet and the magnetic sensor, are made of a mild steel containing up to 3.0% by weight of carbon at a maximum. Since the first and second members function as magnetic blocking portions, for example, a magnetic field generated in the motor provided with the magnetic encoder, and external magnetic fields generated in other devices are blocked by the first member and the second member.

More specifically, in this case, the influence of the external magnetic field on the permanent magnet and the magnetic sensor is suppressed. Accordingly, the majority of the magnetic field detected by the magnetic sensor becomes the magnetic field due to the permanent magnet.

In this manner, according to the above-described configuration, a change in the magnetic field due to the permanent magnet can be detected by the magnetic sensor, under a condition that an external magnetic field or the like is blocked. Accordingly, the angle of rotation of the rotating body can be obtained with good accuracy based on a change in the magnetic field of the permanent magnet. Stated otherwise, the detection accuracy in relation to the angle of rotation of the rotating body is improved.

DESCRIPTION OF EMBODIMENTS

Hereinafter, suitable embodiments of a magnetic encoder according to the present invention will be presented and described in detail with reference to the accompanying drawings. It should be noted that, in the description given below, terms such as "downward" and "upward" correspond to the downward direction and upward direction shown in FIGS. 1 and 2, however, such terms are used only for convenience in order to facilitate understanding, and the terms are not intended to specify directions when the magnetic encoder is actually placed in use. Further, hereinafter, the magnetic encoder may also be simply referred to as an "encoder".

Figure 1:
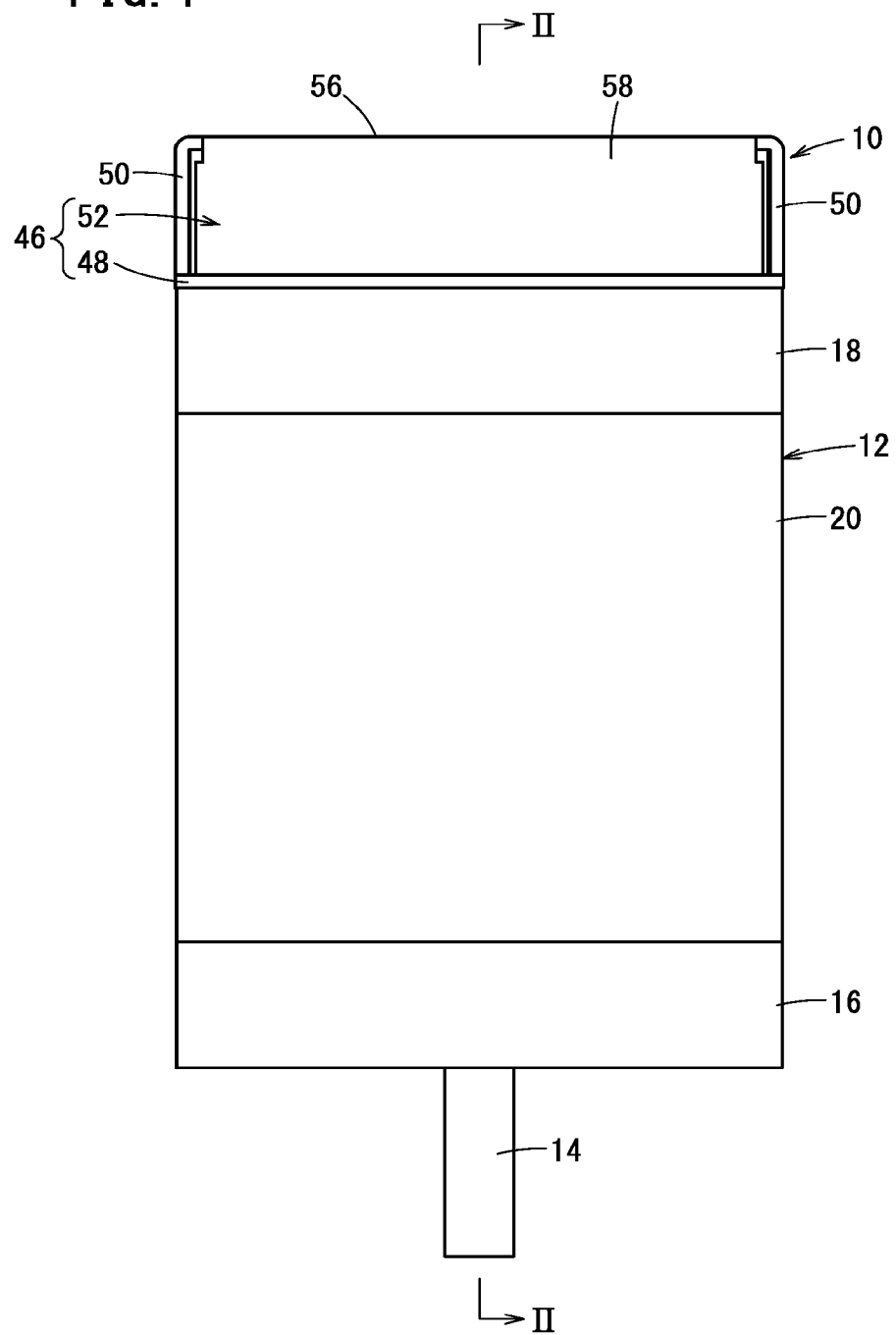
FIG. 1 is a schematic overall front view of the motor (rotational drive unit) provided with a magnetic encoder according to an embodiment of the present invention.
Figure 2:
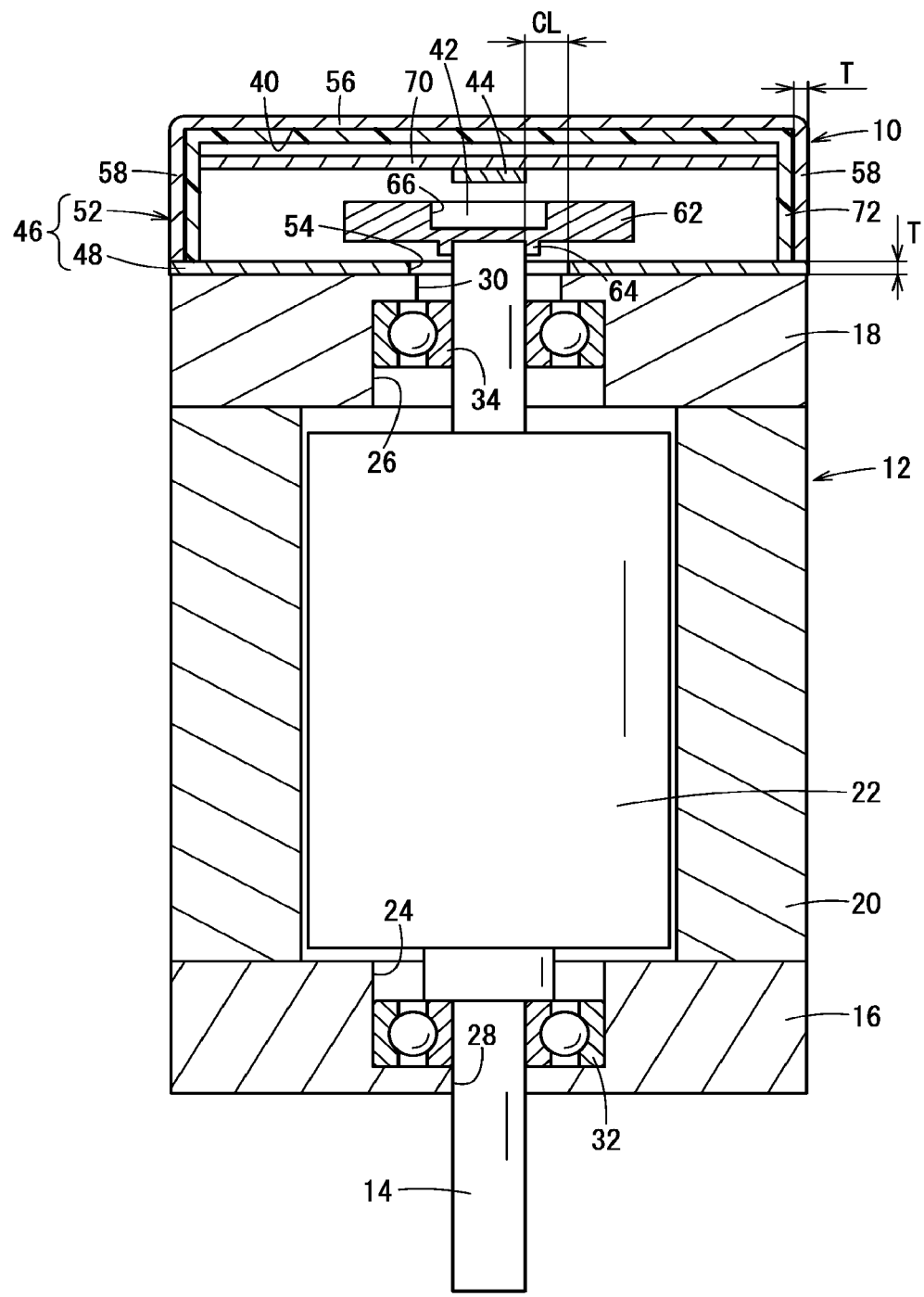
FIG. 2 is a cross-sectional view taken along line II-II in FIG. 1.

FIGS. 1 and 2, respectively, are a schematic overall front view of a motor 12 (rotational drive unit) provided with an encoder 10 according to a present embodiment, and a cross-sectional view taken along line II-II in FIG. 1. The encoder 10 carries out a function of detecting an angle of rotation of a rotating shaft 14 (rotating body) of the motor 12.

First, the motor 12 will be described in outline. The motor 12 includes a stator 20 that is sandwiched between a bottom cover 16 and a top cover 18, and a rotor 22 (see FIG. 2) accommodated in a hollow interior portion of the stator 20. As is well known, the stator 20 is provided with non-illustrated electromagnetic coils that become magnetic accompanying the supply of current thereto. On the other hand, the rotor 22 is provided with non-illustrated permanent magnets. The stator 20 exhibits a substantially quadrangular prismatic shape due to the four outer wall surfaces thereof. Further, the hollow interior portion of the stator 20 exhibits a shape in which a cylindrical columnar body is hollowed out in a manner so that a cross-section thereof in a direction perpendicular to the longitudinal direction is substantially a perfect circle.

The bottom cover 16 and the top cover 18 are formed, respectively, with a large diameter first accommodating recess 24, a second accommodating recess 26, and a first through hole 28 and a second through hole 30 connected to the first accommodating recess 24 and the second accommodating recess 26. The first through hole 28 and the second through hole 30 are set to have a smaller diameter than the first accommodating recess 24 and the second accommodating recess 26, and furthermore, the second through hole 30 has a larger diameter in comparison with the first through hole 28. In addition, a first bearing 32 and a second bearing 34 are individually accommodated in the first accommodating recess 24 and the second accommodating recess 26.

The rotor 22 is provided with the rotating shaft 14 in the form of a rotating body. A lower end portion and an upper end portion of the rotating shaft 14 are exposed, respectively, from a lower end surface and an upper end surface of the rotor 22, and extend respectively toward the bottom cover 16 and the top cover 18. Among the end portions, the lower end portion is passed through the first bearing 32 and the first through hole 28 and exposed from the bottom cover 16. Moreover, the rotating shaft 14 may be either solid or hollow.

On the other hand, the upper end portion penetrates through the second bearing 34 and the second through hole 30, and the end portion thereof is exposed to the exterior from the top cover 18. A foremost distal end of the upper end portion enters into an internal chamber 40, which will be described later.

Next, a description will be given concerning the encoder 10. The encoder 10 is equipped with a holder 62 provided at a foremost distal end of the rotating shaft 14, a permanent magnet 42 used for detection and which is fitted into a retaining recess portion 66 formed on an upper end surface of the holder 62, a magnetic sensor 44, which is retained on a sensor substrate 70 and is arranged in facing relation to a portion of the permanent magnet 42, and a housing 46 that defines the internal chamber 40 in which the permanent magnet 42 and the magnetic sensor 44 are accommodated.

The housing 46 is constituted by combining a closing member 48 in the form of a first member having a substantially square shaped wall portion (first wall portion), and a tubular member 52 (second member) which is approximated by a short square tubular shape and has slits 50 formed in corner portions thereof. In particular, in this case, a lower end of the tubular member 52 is an open end. By the open end being closed by the closing member 48, the internal chamber 40 is formed in the interior of the tubular member 52.

An insertion hole 54 is formed in the closing member 48 along a thickness direction thereof. The foremost distal end of the rotating shaft 14 is passed through the insertion hole 54 and enters into the internal chamber 40. A clearance CL between the rotating shaft 14 and a wall portion forming the insertion hole 54 preferably lies within 3 mm or less. This is because, in the case that the clearance CL were to exceed 3 mm, there is a concern that the magnetic field generated by the motor 12 may pass through the clearance CL and enter into the internal chamber 40. Stated otherwise, in this case, it is not easy to block, with the closing member 48, the magnetism that resides externally of the internal chamber 40.

Figure 3:
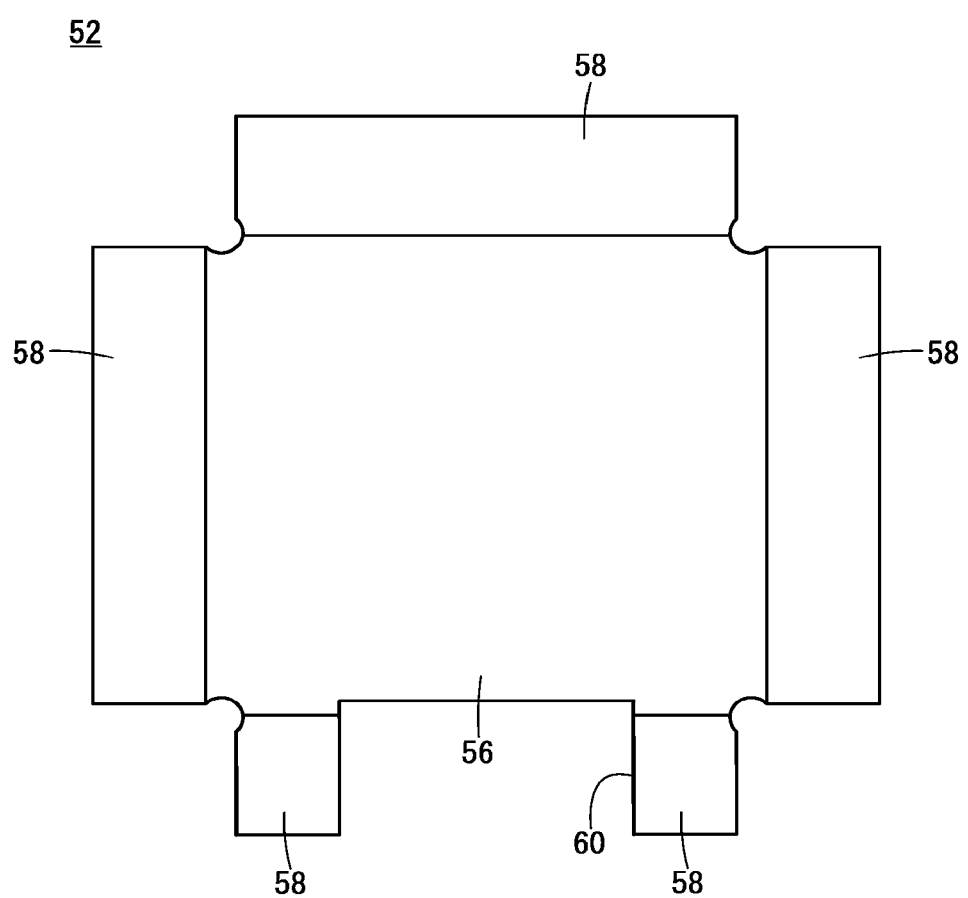
FIG. 3 is a schematic expanded developmental view of a tubular member constituting the magnetic encoder shown in FIG. 1.

As shown in FIG. 3, which is a schematic expanded developmental view of the tubular member 52, the tubular member 52 includes a top plate portion 56 (second wall portion) and five side plate portions 58 individually connected with respect to the top plate portion 56. As shown in FIG. 2, the permanent magnet 42 and the magnetic sensor 44 are arranged so as to be sandwiched between the closing member 48 (the first wall portion) and the top plate portion 56 (the second wall portion).

Figure 4:
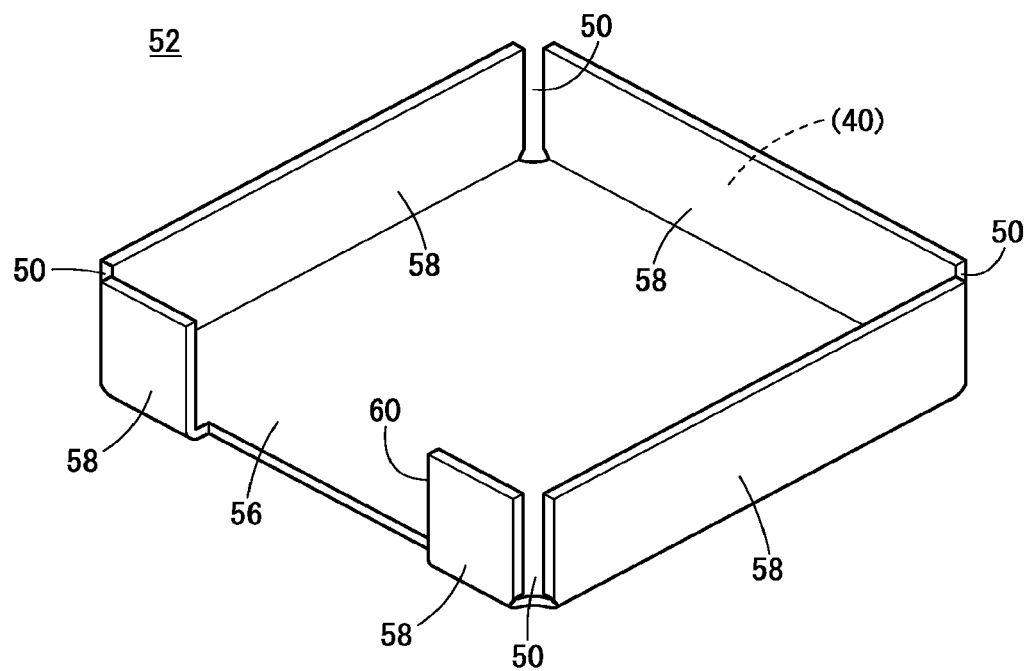
FIG. 4 is a schematic perspective view of the tubular member obtained by bending side plate portions from the state shown in FIG. 3.

In order to obtain the tubular member 52, an intermediate molded body having the shape shown in FIG. 3 is obtained by carrying out a punching process with respect to a plate material that is made from a mild steel as will be described later, and thereafter, the side plate portions 58 are bent at roughly 90° so as to be substantially perpendicular with respect to the top plate portion 56. Consequently, as shown in FIG. 4, the tubular member 52 with the slits 50 being formed between the side plate portions 58 is obtained.

A window portion 60 is formed between two short-dimensioned ones of the bent side plate portions 58. A signal line for electrically connecting the magnetic sensor 44 and a computation unit is passed through the window portion 60. The computation unit and the signal line are not shown.

In this instance, the closing member 48 and the tubular member 52 are made of a mild steel containing up to 3.0% by weight of carbon at a maximum. This is because mild steel can be easily subjected to a molding process, and therefore, the tubular member 52 or the like can be easily obtained. As preferable examples of the type of mild steel, there may be cited cold-rolled mild steel plates and hot-rolled mild steel plates. The cold-rolled mild steel plates are exemplified by SPCC, SPCD, SPCE, SPCF, and SPCG, and the hot-rolled mild steel plates are exemplified by SPHC, SPHD, SPHE, and SPHF. SPCC, SPCD, SPCE, SPCF, and SPCG are material codes specified in JIS G3141, and SPHC, SPHD, SPHE, and SPHF are material codes specified in JIS G3131. It goes without saying that JIS stands for the Japanese Industrial Standards.

SPCC is particularly preferable. As to the reason why, it is because SPCC is inexpensive and is easily available. More specifically, in the case that SPCC is adopted, the housing 46 can be manufactured at a low cost.

Generally, as the material constituting the magnetic blocking portions, a material having a large magnetic permeability and which is easily magnetized is selected. On the other hand, the relative magnetic permeability of the aforementioned mild steels is less than 5000, which is significantly less than the relative magnetic permeability of magnetic materials such as permalloy, pure iron, and silicon iron. More specifically, mild steels have a poor ability to absorb magnetic flux, and are difficult to be magnetized. However, according to the present embodiment, the housing 46, which is made of a mild steel, functions as a magnetic blocking portion that blocks external magnetism, and prevents such magnetism from reaching the internal chamber 40.

It is preferable that the coercivity of the tubular member 52 and the closing member 48, or in other words, the housing 46, is less than or equal to 3 Oe (oersted. More specifically, the housing 46 is a soft magnetic material that easily loses magnetism (magnetic force) when an external magnetic field is eliminated. In order to reduce the coercivity of the tubular member 52 and the closing member 48 to less than or equal to 3 Oe, a mild steel such as SPCC may be subjected to magnetic annealing. In the metallic structure of the housing 46 obtained by subjecting the material (a mild steel plate) to molding or the like, metal grains thereof are coarsened, and the particle size is made non-uniform. However, by subjecting the material to magnetic annealing, the metallic particles become finer, and the particle size thereof becomes substantially uniform. Consequently, any residual strain caused by processing or the like is eliminated, and the coercivity is reduced to less than or equal to 3 Oe.

The thickness T of the tubular member 52 and the closing member 48 is preferably set to 0.5 to 2 mm. If the thickness T is less than 0.5 mm, then because the wall thickness is thin, magnetism easily passes through the tubular member 52 and the closing member 48. Specifically, in this case, it is not easy to block external magnetism. On the other hand, if the thickness T exceeds 2 mm, the housing 46 becomes thick and the weight thereof becomes large. Furthermore, if the thickness T of the tubular member 52 and the closing member 48 is 0.5 to 2 mm, it becomes difficult for magnetism to pass through the tubular member 52 or the closing member 48 having such a thickness. Accordingly, the tubular member 52 and the closing member 48 are capable of sufficiently blocking a magnetic field external to the housing 46.

The holder 62, which exhibits a substantially disk-like shape, is provided at a foremost distal end of the upper end portion of the rotating shaft 14 that has entered into the internal chamber 40. More specifically, an annular convex portion 64 is formed so as to protrude from a lower end surface of the holder 62, and the upper end portion of the rotating shaft 14 is fitted into a circular-shaped hollow interior portion of the annular convex portion 64. On the other hand, a bottomed retaining recess portion 66 is formed on the upper end surface of the holder 62. The permanent magnet 42, which is used for detection, is retained in the holder 62 by being fitted into the retaining recess portion 66.

The sensor substrate 70 is accommodated in the internal chamber 40, and the magnetic sensor 44 is provided on the sensor substrate 70. As noted previously, the magnetic sensor 44 faces toward a portion of the permanent magnet 42. The magnetic sensor 44 is electrically connected to the computation unit via the signal line, and transmits a detection signal to the computation unit via the signal line.

An internal casing 72 that exhibits a square tubular shape and is made from a resin is accommodated in the internal chamber 40. The holder 62, the permanent magnet 42, the sensor substrate 70, and the magnetic sensor 44 are accommodated in a hollow interior portion of the internal casing 72. Stated otherwise, the holder 62, the permanent magnet 42, the sensor substrate 70, and the magnetic sensor 44 are surrounded by the internal casing 72. A non-illustrated communication hole connected to the window portion 60 is formed in the internal casing 72, and the signal line connecting the magnetic sensor 44 and the computation unit is drawn out to the exterior of the internal chamber 40 from the communication hole and the window portion 60.

A manufacturing process for the encoder 10 will briefly be described. When the tubular member 52 is manufactured, as described previously, a punching process is carried out using a plate material made from a mild steel (for example, SPCC) to thereby obtain an intermediate molded body having the shape shown in FIG. 3. Next, the side plate portions 58 are bent at roughly 90° so as to be substantially perpendicular to the top plate portion 56, thereby forming the tubular member 52. In the case that the material is SPCC, it is particularly easy to carry out the punching process and such bending. Similarly, the closing member 48 is also obtained by a punching process using as the material thereof a plate material made from a mild steel.

Furthermore, the tubular member 52 and the closing member 48 are subjected to magnetic annealing. The magnetic annealing process conditions are preferably set in a manner so that the coercivity of the tubular member 52 and the closing member 48 is less than or equal to 3 Oe. With S45C, which is a typical carbon steel, the coercivity is comparatively large, i.e., on the order of 41 Oe. Further, even if a low carbon steel having a carbon content of 0.5% by weight is subjected to annealing, the coercivity is roughly 8 Oe. From this fact, it can be understood that the coercivity of the housing 46 is less than that of a general carbon steel.

Next, the internal casing 72 is accommodated inside the tubular member 52 which has been subjected to magnetic annealing, and furthermore, the sensor substrate 70 and the magnetic sensor 44 are accommodated in the hollow interior portion of the internal casing 72. On the other hand, after the closing member 48 has been arranged on the upper end surface of the top cover 18, and the foremost distal end of the upper end portion of the rotating shaft 14 has been passed through the insertion hole 54, the holder 62 in which the permanent magnet 42 is accommodated is attached to the foremost distal end. Of course, at this time, the upper end portion of the rotating shaft 14 is fitted into the hollow interior portion of the annular convex portion 64 that is provided on the lower end surface of the holder 62.

Next, the tubular member 52 is placed on the closing member 48, and the tubular member 52 and the closing member 48 are joined via a non-illustrated connecting member such as screws or the like. Consequently, the encoder 10 is constructed.

The encoder 10 according to the present embodiment is basically configured in the manner described above. Next, operations and advantageous effects of the encoder 10 will be described.

The encoder 10 detects the angle of rotation of the rotating shaft 14. More specifically, when a current is supplied to the electromagnetic coils constituting the stator 20, in accordance therewith, an alternating magnetic field is generated in the stator 20. The rotor 22 and the rotating shaft 14 rotate together integrally due to repulsion and attraction between the alternating magnetic field, and the magnetic field generated by the permanent magnets in the rotor 22. Moreover, since the first bearing 32 and the second bearing 34 are interposed between the rotating shaft 14 and the bottom cover 16 and between the rotating shaft 14 and the top cover 18, the bottom cover 16, the top cover 18, and the stator 20 are prevented from following along and rotating together with the rotating shaft 14.

Accompanying rotation of the rotating shaft 14, the holder 62, which is provided at the foremost distal end of the upper end portion thereof, rotates, and at the same time, the permanent magnet 42, which is used for detection and is retained in the holder 62, rotates. The permanent magnet 42 is arranged in a manner so that a plurality of N poles and S poles appear alternately along the circumferential direction. Accordingly, when the permanent magnet 42 undergoes rotation, the north poles and the south poles alternately are placed in facing relation with respect to the magnetic sensor 44. Therefore, the magnetic field generated by the permanent magnet 42 changes in the vicinity of the magnetic sensor 44. Accompanying such a change in the magnetic field, the detection signal, which is transmitted from the magnetic sensor 44 to the computation unit via the signal line, also changes.

The computation unit recognizes that the magnetic field has undergone a change based on the change in the detection signal, and from the number of changes and the degree of the changes, calculates the angle of rotation of the rotating shaft 14. In accordance with this feature, the angle of rotation of the rotating shaft 14 is detected.

In this instance, in the motor 12, as described above, a magnetic field is generated by the electromagnetic coils and the permanent magnets. However, such a magnetic field is blocked by the closing member 48. More specifically, due to the closing member 48, the magnetic field generated by the motor 12 is effectively prevented from exerting an influence on the permanent magnet 42 and the magnetic sensor 44 inside of the internal chamber 40.

Further, it is assumed that the encoder 10 is used under a condition in which a device (another motor, an electromagnetic coil, etc.) that generates an external magnetic field is arranged in the vicinity of the housing 46. However, in such a case, the tubular member 52 blocks the external magnetic field. Stated otherwise, the tubular member 52 effectively prevents the external magnetic field, which is generated externally of the housing 46, from exerting an influence on the permanent magnet 42 and the magnetic sensor 44 inside of the internal chamber 40.

Further, by setting the thickness T of the tubular member 52 and the closing member 48 to 0.5 to 2 mm, the magnetic field generated by the motor 12 and the external magnetic field are effectively blocked with respect to the internal chamber 40. Furthermore, by the clearance CL between the rotating shaft 14 and the wall portion forming the insertion hole 54 being set to be less than or equal to 3 mm, the magnetic field generated by the motor 12 is prevented from entering into the internal chamber 40 through the insertion hole 54.

Combined with the aforementioned features, the permanent magnet 42 and the magnetic sensor 44 are sufficiently suppressed from receiving any influence due to the magnetic field generated by the motor 12 and the external magnetic field. Accordingly, the majority of the detection signal due to the magnetic sensor 44 is based on the magnetic field generated by the permanent magnet 42 used for detection. Since the computation unit detects the angle of rotation of the rotating shaft 14 based on the detection signal, the angle of rotation of the rotating shaft 14 can be obtained with good accuracy. Stated otherwise, the accuracy in detecting the angle of rotation is satisfactory.

Typically, when comparing an angular error obtained in an encoder configured using a housing that has not been subjected to magnetic annealing, and an angular error obtained in the encoder 10 configured using the housing 46 that has been subjected to magnetic annealing and in which the coercivity has become less than or equal to 3 Oe, the latter of these errors is roughly ½ of the former. From this fact, it is clear that the housing 46 functions effectively as a magnetic blocking portion. It should be noted that the angular error is calculated as a value obtained by having subtracted the actual angle of rotation from the detected angle of rotation.

In the foregoing manner, according to the present embodiment in which the permanent magnet 42 and the magnetic sensor 44 are accommodated in the internal chamber 40 of the housing 46 that has been subjected to magnetic annealing, since the housing 46 functions as a magnetic blocking portion, it is possible to improve the detection accuracy in relation to the angle of rotation of the rotating shaft 14.

Further, since the internal casing 72 is arranged in the interior of the internal chamber 40, the permanent magnet 42 and the magnetic sensor 44 are protected by the internal casing 72 from foreign matter such as dust or the like. Therefore, it is possible to prevent such foreign matter from entering or biting into the second bearing 34.

After detection of the angle of rotation has been completed, the supply of current to the electromagnetic coils is stopped. As a result, rotation of the rotor 22 and the rotating shaft 14 is also stopped. Along therewith, the magnetic field generated by the motor 12 vanishes. In the case that the coercivity of the closing member 48 is small, i.e., on the order of less than or equal to 3 Oe, when the magnetic field generated by the stator 20 constituting the motor 12 vanishes, the magnetism corresponding thereto is rapidly lost. Therefore, it is difficult for a large amount of magnetism to remain in the closing member 48. Accordingly, when the angle of rotation is detected the next time, it is possible to suppress insofar as possible any influence on the permanent magnet 42 and the magnetic sensor 44 of such residual magnetism remaining in the closing member 48.

Similarly, in the case that the coercivity of the tubular member 52 is small, i.e., on the order of less than or equal to 3 Oe, the magnetism is rapidly lost when the external magnetic field vanishes. More specifically, in this case, it is difficult for such magnetism to remain in the tubular member 52. Accordingly, when the angle of rotation is detected the next time, the permanent magnet 42 and the magnetic sensor 44 are prevented from receiving any influence of such residual magnetism remaining in the tubular member 52.

In the foregoing manner, by reducing the coercivity of the housing 46, the angle of rotation can be obtained with good accuracy the next time that the angle of rotation is detected.

The present invention is not particularly limited to the embodiment described above, and various modifications can be adopted therein without deviating from the essence and scope of the present invention.

For example, the tubular member 52 may be manufactured by deep drawing. In this case, it is also possible to obtain the tubular member 52 as a product in which the slits 50 are not formed therein.

In addition, the tubular member 52 may be provided as the first member, and the closing member 48 may be provided as the second member. In this case, the open end of the tubular member 52 may be oriented in the upward direction of FIGS. 1 and 2.

Figure 5:
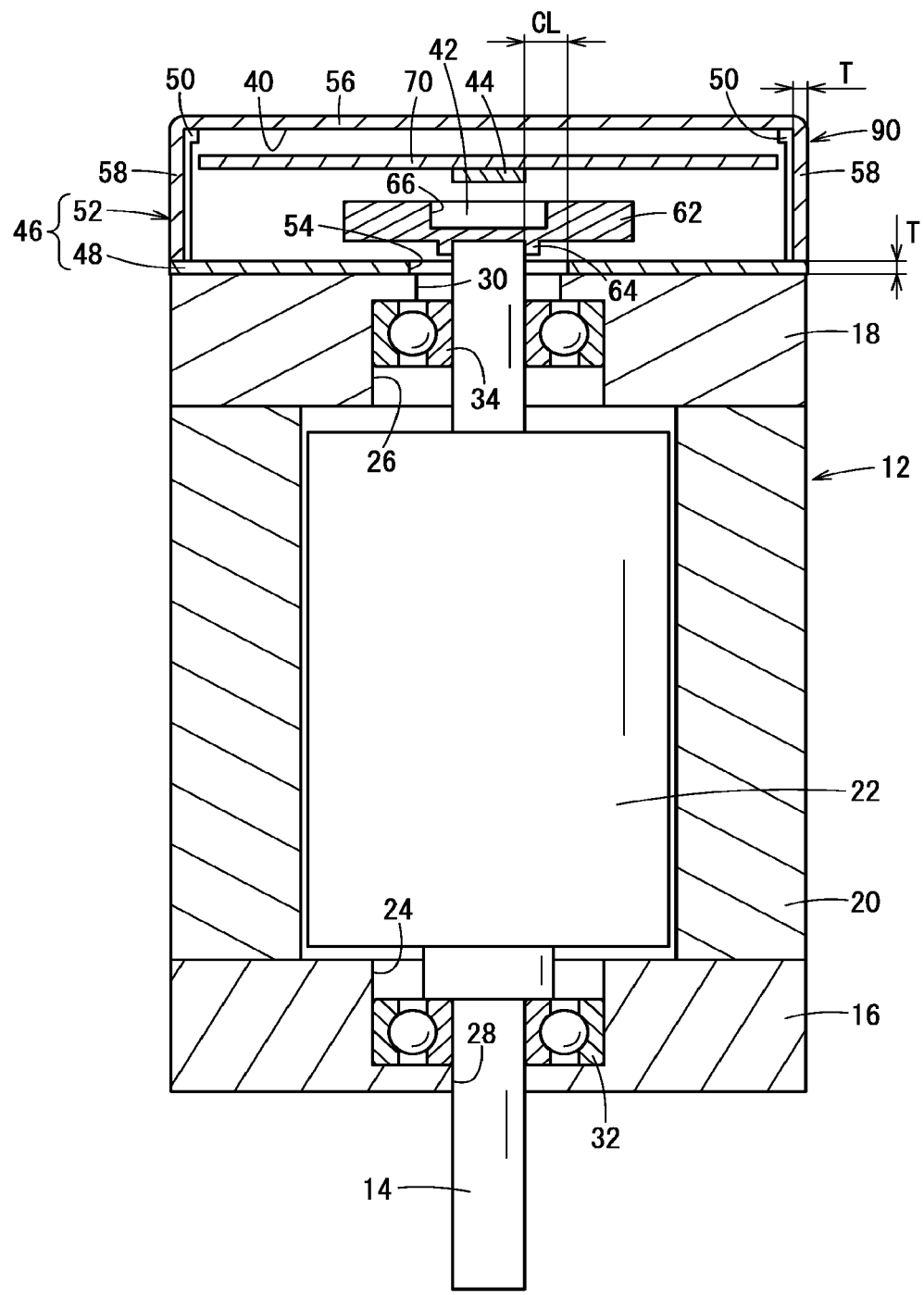
FIG. 5 is a schematic vertical cross-sectional view of a motor provided with a magnetic encoder in which an internal casing is omitted.

Further, it is not essential that the internal casing 72 which is made of a resin material be provided, and as shown in FIG. 5, an encoder 90 may be constructed in which the internal casing 72 is omitted.

Figure 6:
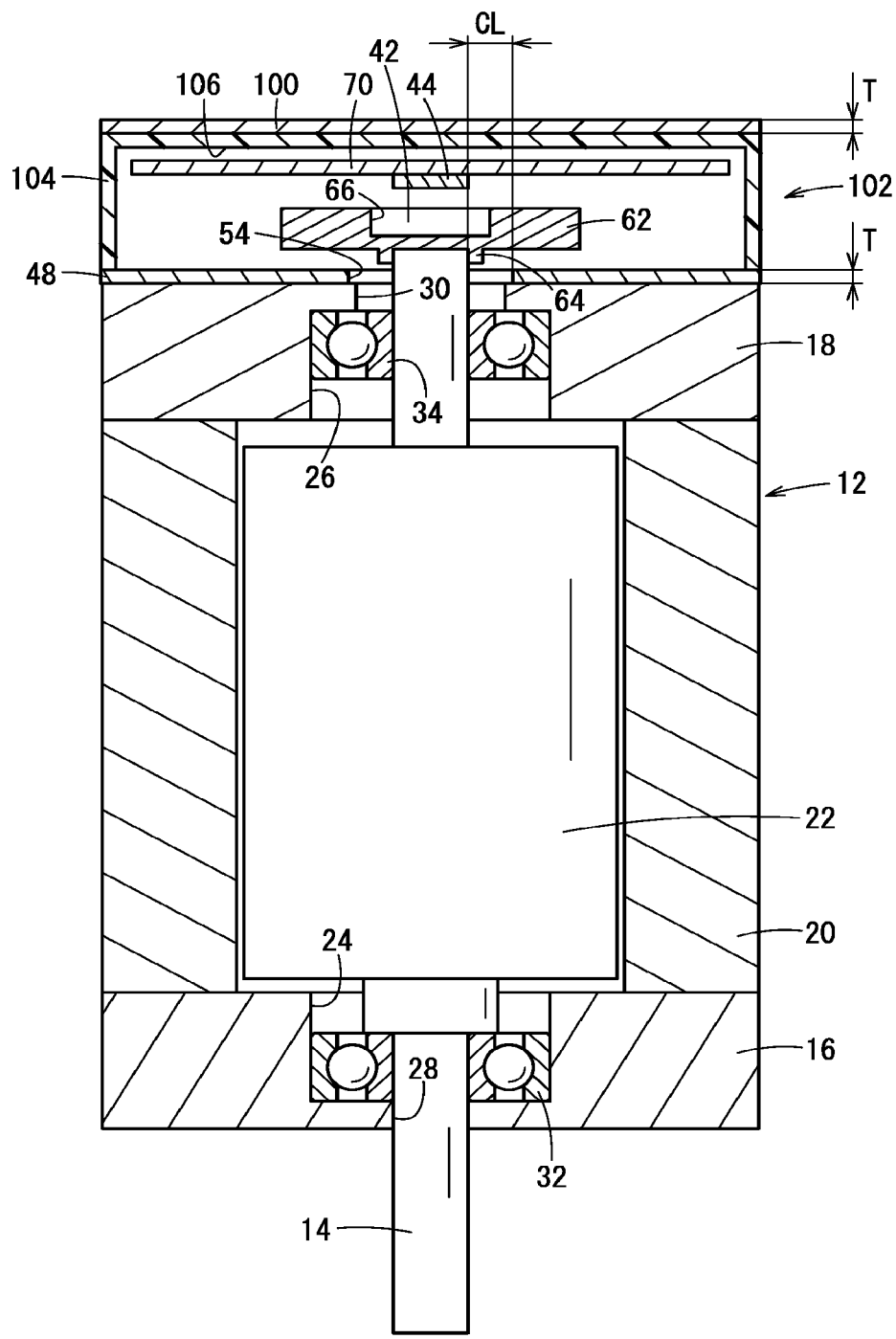
FIG. 6 is a schematic vertical cross-sectional view of a motor provided with a magnetic encoder according to another embodiment.

Furthermore, in the present embodiment, a case has been illustrated by example in which the tubular member 52 is used as the second member. However, as shown in FIG. 6, an encoder 102 may be constructed in which a flat plate member 100 having only a flat plate-shaped second wall portion is used as the second member. In this case, an internal chamber 106 is formed by a casing 104 that is made from a resin and having a square tubular shape, and a closing member 48 that closes an open end of the casing 104, and the permanent magnet 42 and the magnetic sensor 44 are accommodated inside the internal chamber 106.

In this case, the closing member 48 and the flat plate member 100 function as magnetic blocking portions. More specifically, in the present embodiment as well, the same advantageous effects as those of the encoders 10 and 90 shown in FIGS. 1 to 5 can be obtained.

In any of the embodiments, another rotating body (rotating member) may be connected to the lower end portion of the rotating shaft 14, directly or indirectly via a rotating member such as a gear or a pulley or the like. In this case, the angle of rotation of the rotating body can be obtained indirectly by detecting the angle of rotation of the rotating shaft 14 of the motor 12.

REFERENCE NUMERALS

10, 90, 102 . . . magnetic encoder
12 . . . motor
14 . . . rotating shaft
20 . . . stator
22 . . . rotor
40, 106 . . . internal chamber
42 . . . permanent magnet
44 . . . magnetic sensor
46 . . . housing
48 . . . closing member
50 . . . slit
52 . . . tubular member
54 . . . insertion hole
62 . . . holder
70 . . . sensor substrate
72 . . . internal casing
100 . . . flat plate member
104 . . . casing
CL . . . clearance

The invention claimed is:

1. A magnetic encoder having
a permanent magnet configured to rotate accompanying rotation of a rotating body constituting a rotational drive unit, and
a magnetic sensor configured to detect a change in a magnetic field of the permanent magnet,
the magnetic encoder comprising:
a first member including a first wall portion in which an insertion hole is formed through which the rotating body is passed; and
a second member including a second wall portion sandwiching the permanent magnet and the magnetic sensor between the second wall portion and the first wall portion,
wherein the first member and the second member are made of a mild steel containing up to 3.0% by weight of carbon, and
wherein a coercivity of the first member and the second member is less than or equal to 3 oersted.

2. The magnetic encoder according to claim 1, wherein the first member and the second member are made from cold-rolled mild steel plates.

3. The magnetic encoder according to claim 1, wherein a thickness of the first member and the second member is 0.5 to 2 mm.

4. The magnetic encoder according to claim 1, wherein a clearance between the rotating body and the first wall portion forming the insertion hole lies within 3 mm.

5. The magnetic encoder according to claim 1, wherein a casing in which the permanent magnet and the magnetic sensor are accommodated is provided between the first member and the second member.

6. The magnetic encoder according to claim 1, wherein one of the first member and the second member is made from a tubular member having an open end at one end thereof, and the remaining member is a closing member configured to close the open end.

* * * * *